(12) United States Patent
Kacher (10) Patent No.: US 8,787,690 B2
(45) Date of Patent: Jul. 22, 2014

(54) BINARIZING AN IMAGE (75) Inventor: Olga Kacher, Moscow (RU)

(73) Assignee: ABBYY Development LLC, Moscow (RU)

(*) Notice: Subject to any disclaimer, the term of this patent is extended or adjusted under 35 U.S.C. 154(b) by 269 days.

(21) Appl. No.: 13/328,239

(22) Filed: Dec. 16, 2011

(65) Prior Publication Data

US 2012/0087587 A1     Apr. 12, 2012

Related U.S. Application Data

(63) Continuation-in-part of application No. 12/269,789, filed on Nov. 12, 2008, now Pat. No. 8,098,945.

(51) Int. Cl.
*G06K 9/36*     (2006.01)
(52) U.S. Cl.
USPC ............................ 382/237; 382/173; 382/224
(58) Field of Classification Search
CPC ........... G06K 9/38; G06K 9/48; H04N 1/403; H04N 1/4051; H04N 1/4105; H04N 1/4052; G06T 7/0083; G06T 2207/10016; G06T 5/001; G06T 7/0085
USPC ......... 382/237, 173, 224, 266, 286, 276, 284, 382/182, 199; 358/2.1, 494, 453, 1.15, 358/1.13; 348/E7.079; 198/502.1, 810.02
See application file for complete search history.

(56) References Cited

U.S. PATENT DOCUMENTS

| | | | |
|---|---|---|---|
| 5,850,295 A | 12/1998 | Uchiyama et al. | |
| 6,404,919 B1 | 6/2002 | Nishigaki et al. | |
| 6,731,407 B1 | 5/2004 | Hayama | |
| 7,057,595 B1 | 6/2006 | Benyoub et al. | |
| 7,298,897 B1 | 11/2007 | Dominguez et al. | |
| 7,333,656 B2 | 2/2008 | Takarada | |
| 7,801,352 B2 | 9/2010 | Uchiyama et al. | |
| 7,978,898 B2 | 7/2011 | Uchiyama et al. | |
| 8,098,945 B2 | 1/2012 | Kacher | |
| 8,559,748 B2 * | 10/2013 | Banerjee et al. | 382/266 |
| 2010/0119168 A1 | 5/2010 | Kacher | |

OTHER PUBLICATIONS

Rais et al., "Adaptive Thresholding Technique for Document Images Analysis", IEEE, Sep. 2004, pp. 61-66.

* cited by examiner

*Primary Examiner* — Anh Do
(74) *Attorney, Agent, or Firm* — LeighAnn Weiland; Veronica Weinstein; Aditya Krishnan (57) ABSTRACT

The invention provides various methods and techniques for binarizing an image, generally in advance of further processing such as optical character recognition (OCR). One step includes establishing boundaries of image objects of an image and classifying each image object as either suspect or non-suspect. Another step includes creating a local binarization threshold map that may include or store threshold binarization values associated with image objects classified as non-suspect. Yet another step includes expanding the local binarization threshold map to cover the entire image thereby creating a global binarization threshold map for the entire image. The methods and techniques are capable of identifying and working with separation objects and incuts in images.

19 Claims, 7 Drawing Sheets

BINARIZING AN IMAGE

CROSS-REFERENCE TO RELATED APPLICATIONS

For purposes of the USPTO extra-statutory requirements, the present application constitutes a continuation-in-part of U.S. patent application Ser. No. 12/269,789 that was filed on 12 Nov. 2008, now U.S. Pat. No. 8,098,945, or is an application of which a currently co-pending application is entitled to the benefit of the filing date.

The United States Patent Office (USPTO) has published a notice effectively stating that the USPTO's computer programs require that patent applicants reference both a serial number and indicate whether an application is a continuation or continuation-in-part. See Stephen G. Kunin, Benefit of Prior-Filed Application, USPTO Official Gazette 18 Mar. 2003. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

FIELD

Embodiments of the present invention relate to Optical Character Recognition (OCR), and particularly to a method and system for binarizing an image.

BACKGROUND

OCR is a technology that enables conversion of images (e.g. scanned or photographed images) of printed text into machine-editable and searchable text. Binarization is an important process which prepares an image for OCR. Better binarization quality results in higher quality of OCR. Each pixel of a binarized image may have only one of two values—black or white.

Pixels of grayscale images are additionally characterized by a number representing brightness, for example, from 0 (black) to 255 (white). In order to binarize a grayscale image, a brightness threshold must be established for each pixel; a pixel with a brightness level above this threshold is considered white and a pixel with a brightness level below this threshold is considered black. A potential difficulty of image binarization lies in establishing thresholds so that an image is not distorted and no valuable information (i.e., the text to be recognized) is lost.

SUMMARY

Embodiments of the present invention disclose methods for binarizing an image. One method comprises establishing boundaries of image objects of the image and classifying each image object as either suspect or non-suspect. The method further comprises creating a local binarization threshold map comprising threshold binarization values associated with image objects classified as non-suspect and expanding the local binarization threshold map to cover the entire image thereby to create a global binarization threshold map for the entire image.

The method may comprise creating a binarized image based on the global binarization threshold map and, and optionally, applying an OCR algorithm to the binarized image. Embodiments of the invention also are directed to a system for implementing said method.

In other words, the present invention provides for binarizing an image by creating a binarization threshold map. The map may include threshold values for each pixel of the source image and is created in several stages. First, the boundaries of all the image objects (i.e., text, tables, full stops, separators, solid areas, etc.) are established based on the information about the objects' contrast values. Next, the map is created locally around non-suspect objects. Finally, the map is expanded and interpolated to cover the entire image.

BRIEF DESCRIPTION OF THE DRAWINGS

FIG. 2 shows an image obtained from the image in FIG. 1 by applying the image binarization method in accordance with an example embodiment.

DETAILED DESCRIPTION

In the following description, for purposes of explanation, numerous specific details are set forth in order to provide an understanding of the invention. It will be apparent, however, to one skilled in the art that the invention can be practiced without these specific details. In other instances, structures and devices are shown only in block diagram form in order to avoid obscuring the invention.

Reference in this specification to "one embodiment" or "an embodiment" means that a particular feature, structure, or characteristic described in connection with the embodiment is included in at least one embodiment of the invention. The appearance of the phrases "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Embodiments of the present invention disclose a method for binarizing an image. The method comprises establishing boundaries of image objects of the image and classifying each image object as either suspect or non-suspect. The method further comprises creating a local binarization threshold map comprising threshold binarization values associated with image objects classified as non-suspect and then expanding the local binarization threshold map to cover the entire image thereby to create a global binarization threshold map for the entire image.

The method may then comprise creating a binarized image from color or grayscale image based on the global binarization threshold map and applying an OCR algorithm to the binarized image.

Figure 1:
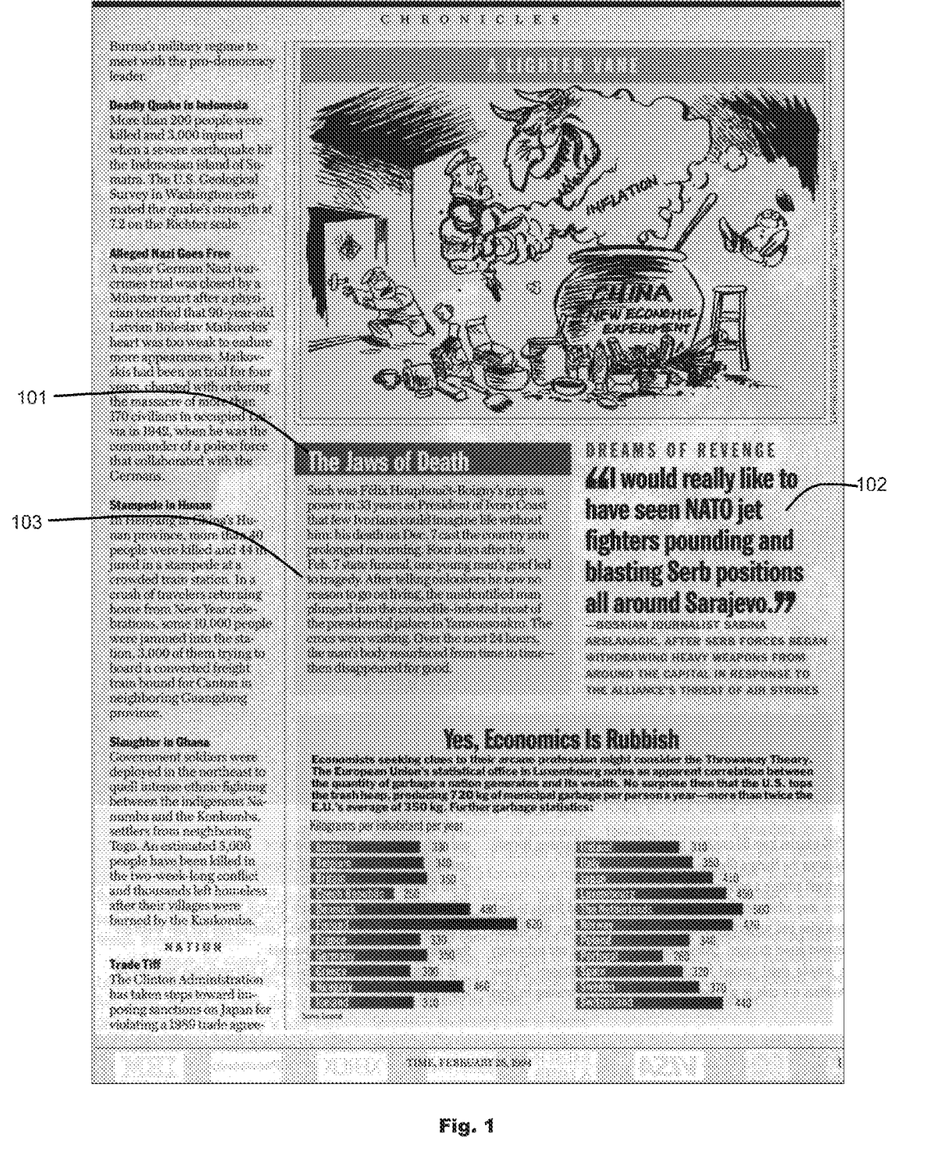
FIG. 1 shows an example of source image.

FIG. 1 shows an example of a source image to be binarized, prior to being subjected to an optical character recognition (OCR) process.

FIG. 2 shows a resultant image obtained by applying a method for binarizing an image to the source image of FIG. 1 in accordance with an example embodiment of the present invention. A purpose of pre-OCR binarization is to ensure detection of the maximum number of text objects, in other words, to enhance the effectiveness of the OCR process.

With this in mind, a method in accordance with an exemplary embodiment is further described with reference to FIG. 3. First, an image is loaded or acquired, at block 301.

Figure 4A:
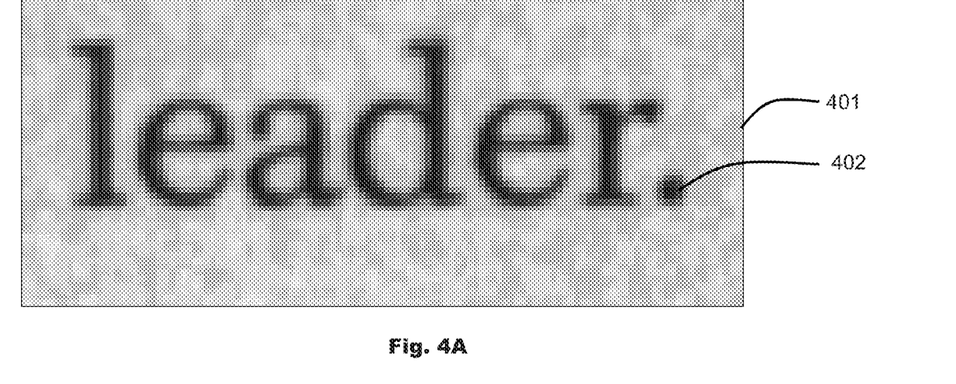
FIG. 4A is an enlargement of a fragment 401 of FIG. 1.
Figure 4B:
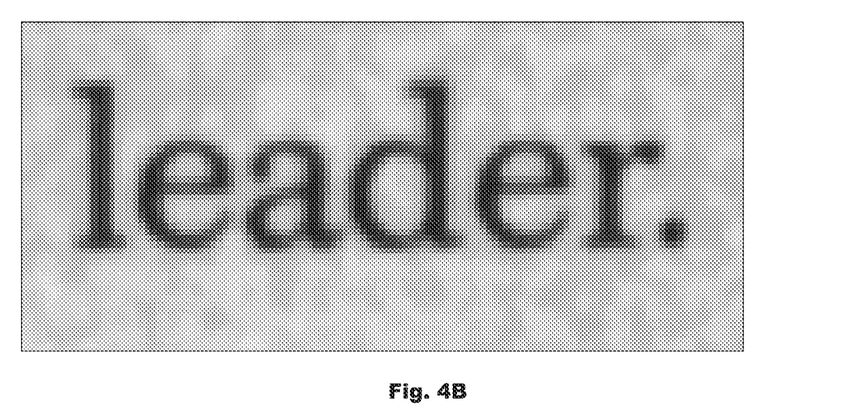
FIG. 4B shows the fragment 401 after smoothing.

A good identifier of a text object is the text's boundaries; the higher the text contrast, the sharper its boundaries. Thus, boundaries may be detected by finding objects with high contrast. However, textured areas may pose problems, as textures often have contrast close to that of contrast at, near or associated with text. Therefore, prior to detecting object boundaries, the method may comprise smoothing the image, at block 302. The smoothing process should smooth the textured areas without blurring the contrast boundaries between meaningful objects. This can be successfully achieved by using, for example, a nonlinear filter. More particularly, FIG. 4A shows an enlarged fragment 401 of the source image shown in FIG. 1, while FIG. 4B shows the same fragment after it has been smoothed.

Figure 4C:
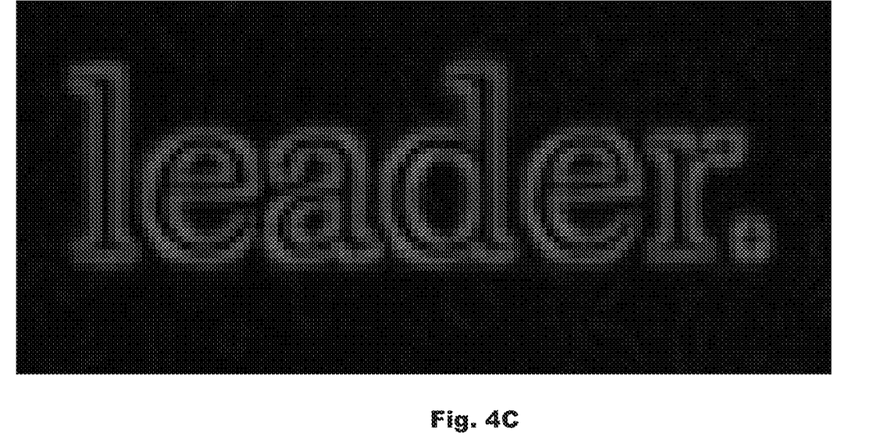
FIG. 4C shows the fragment 401 on a gradient image.

To establish the boundaries of the image objects (further referred to merely as objects), a gradient image is created or built, at block 303, on which objects with high contrast are identified. The gradient is a function of the brightness of a pixel and is computed based on the pixel's neighboring pixels. To compute the gradient, for example, the Sobel 3×3 operator may be used. The Sobel operator is a discrete differentiation operator, which computes an approximation of the gradient of the image intensity function. FIG. 4C shows a gradient image of the fragment 401 obtained from the smoothed image of FIG. 4B.

Returning to FIG. 3, pixels with sufficiently high values of the gradient are considered as boundaries. Therefore, in accordance with an example embodiment, finding text on an image comprises detecting the boundaries of the image, at block 304. It may be problematic to identify or define the threshold above which the value of the gradient is sufficiently high. In other words, it is necessary to define an appropriate gradient binarization threshold. If the threshold is too low, the boundaries will be identified on textures and small noise, and if it is too high, the boundaries of meaningful objects may not be identified at all.

Figure 4D:
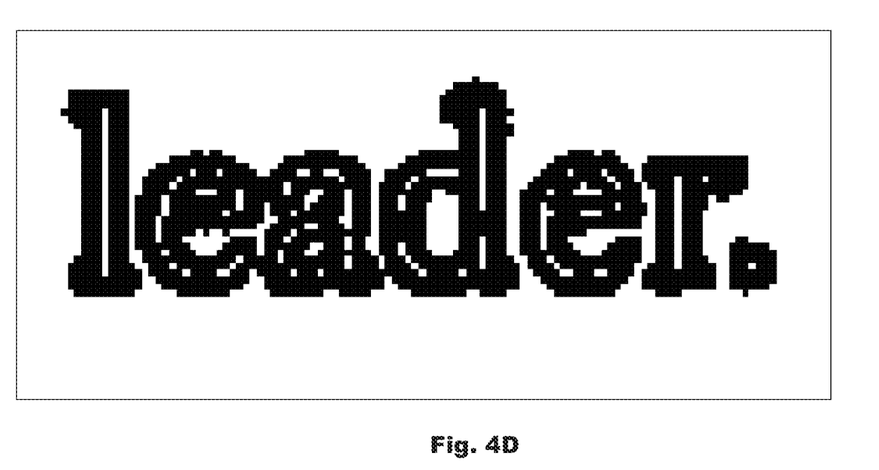
FIG. 4D shows the fragment 401 with the established object boundaries.

For most images, acceptable gradient binarization thresholds lie between 30 and 60 on a scale of 0 to 255. For images without background noise, which may contain low-contrast elements, the threshold may be lower, whereas for images with textured areas, the threshold may be higher. The following technique may be used to determine whether an image belongs to the first or to the second category. A relative number of pixels with low gradient values is determined (in the range from 0 to 5). Such pixels with low gradient values may be plentiful on images without background noise (around 60%) and scarce on images with textured areas (around 20-30%). Based at least in part on this criterion, the gradient binarization threshold may be selected. In this example embodiment, a relative number of pixels with low gradient values is estimated in an image. In correspondence with this number, a constant value of the threshold is fixed which in turn is used for binarization of the whole image. FIG. 4D shows the established boundaries of the objects on fragment 401.

Broadly, in accordance with an example embodiment, objects on the image are identified (i.e., their boundaries are established) to binarize the local neighborhoods of these objects, and then the thresholds obtained in the local binarization are applied to the entire image, such as through the creation of a threshold map. The threshold map is composed of, for example, threshold binarization values for each pixel of the source image. Other arrangements for a threshold map are possible. Once the threshold map is created, a binarization is performed by comparing the brightness value of each pixel with the threshold value assigned to it.

Difficulties may arise in the course of local binarization. If, for example in a page of a magazine or book, there is a color incut or frame with color fill on a white page and there is darker text on the incut or frame (e.g., gray solid area with black text 103 on a white page), then the text should be binarized to black and the rest of the page (i.e., the color fill and page background) should be binarized to white. However, if the incut has sufficient contrast, its boundaries may be successfully identified. If these boundaries are binarized locally (i.e., the contrast of each pixel is above the threshold binarization value), they will be binarized to black, and the text on this incut will not be identified. Wrong thresholds like these should not be applied to the neighboring pixels. A similar problem may arise with small-sized noise, table cells, separators, etc. because the small-sized noise could lead to obscuring of an entire table, table heading, column, row, etc.

For correct binarizing various separation objects (including incuts, frames, table cells, etc.), the following method may be used. All separation objects can be divided into two types: "real" separators and gradient separators. A simple example of "real" separator is a solid black or color line on a white background. A simple example of gradient separator is a gray incut with black text on a white background. An incut does not have any clear outline boundaries, there is just a gradient change from one color to another. A result of correct binarization of a gradient separator should keep all text on a white background. For the binarization method, both types of separation objects seem similar and the separator boundaries then can be easily found and locally binarized. It may be difficult to distinguish which type of separator is on a page or in an image. Thus, other steps may be used to distinguish separators. In principle, real should be identified, and boundaries of incuts should be discarded, as long as the text in the incut is identified as belonging to the incut. To distinguish gradient separators from "real" separators, and to correctly binarize the separators, in one embodiment a method of directed gradients may be used and is explained further.

Crossing a boundary of a separator, the method of directed gradients checks how many times the gradient changes its direction. In the case of "real" separators, the direction changes two times (e.g., from light color to dark and back—from dark to light). In the case of gradient separators, the direction of gradient changes only one time. Thus, separation objects can be easily classified, and local binarization can be corrected.

During local binarization, the objects may be classified, at block 305, into suspect objects and non-suspect objects in order to avoid applying wrong thresholds to neighboring pixels. The threshold map is created in the neighborhoods or areas surrounding non-suspect objects and only then is the threshold map applied to the entire image. Suspect objects include small-sized noise, separators, very large objects, table cells, and small and elongated objects. Text is a non-suspect object.

However, it is very difficult to classify objects globally, as the same object may be suspect in one case and non-suspect in another (e.g., a very large letter is suspect if located next to small-print text, but is not suspect on its own and should be binarized; a solid color frame or incut which contains text is suspect, but an empty solid color frame or incut is non-suspect). Therefore, a more complex classification may be used. For each object, a penalty may be specified, depending on the size of the object, the ratio of its sides, presence of other objects inside it, etc.

The following exemplary criteria may be used to identify suspect objects:
   The number of pixels in the object (to cut off small objects),
   The area and/or linear dimensions of the object (to cut off very large objects),
   The number of inside objects (to cut off incuts and table cells), and
   The ratio of the sides of the object (to cut off separators and thin lines).

Objects are best classified locally. For this purpose, the image is segmented into segments, for example squares. In one example, squares of 64×64 pixels are used, and for each segment, a mean penalty is calculated based on the objects contained inside the segment. The objects with a small (insignificant) penalty may be considered non-suspect, and all the others may then be considered suspect. If an object is deemed suspect in at least one segment, it automatically may be deemed suspect in all the other segments.

Figure 3:
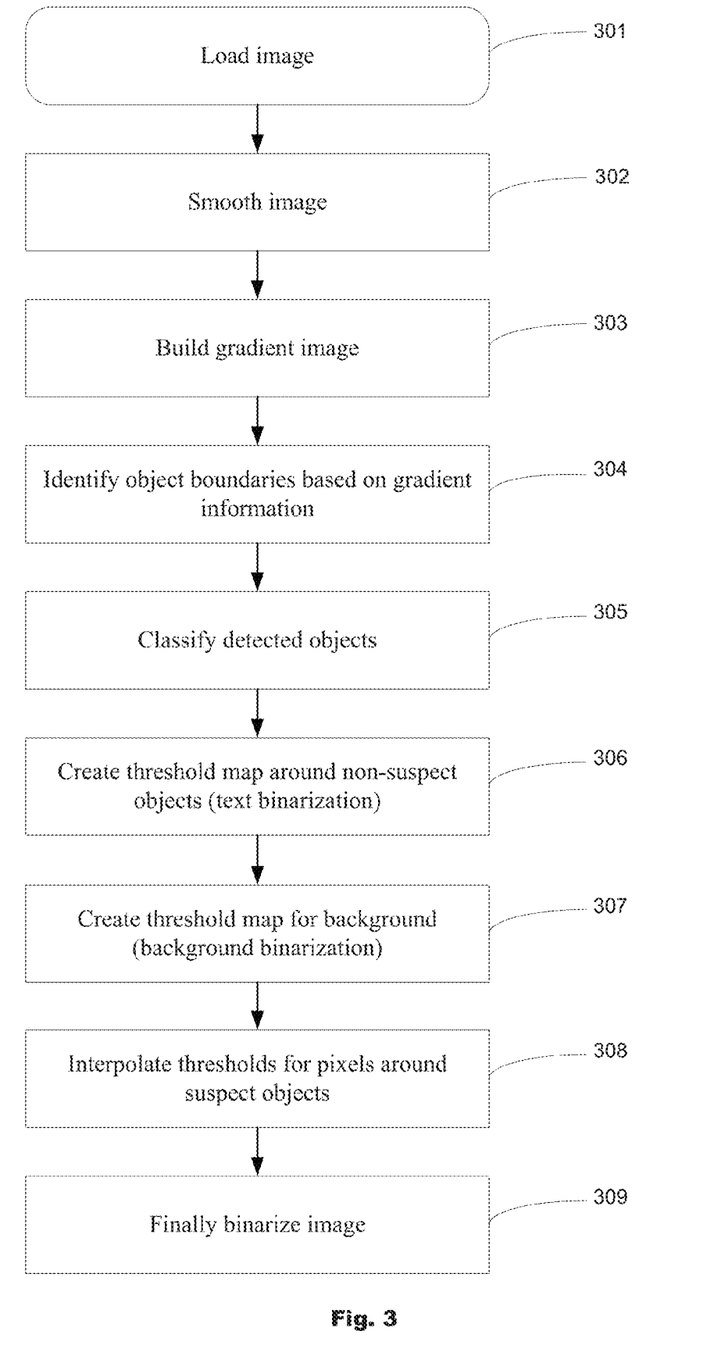
FIG. 3 shows a flowchart of a method of image binarization, in accordance with an example embodiment.
Figure 4E:
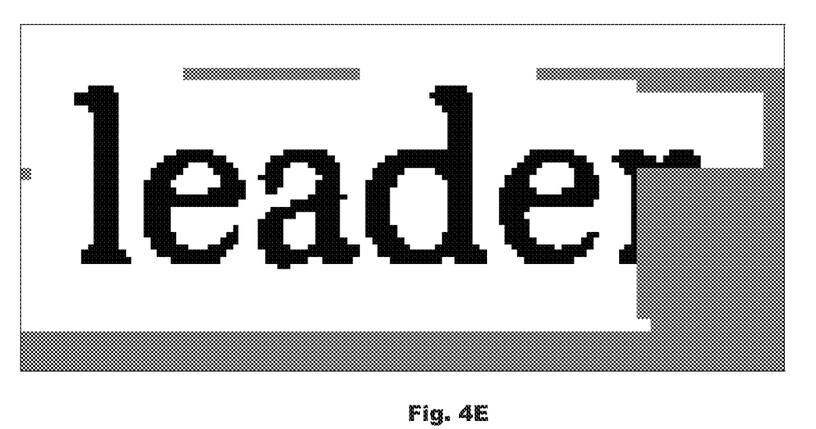
FIG. 4E shows the fragment 401 after text binarization.

Once the objects are classified, the threshold map is created, at block 306 of FIG. 3, in the neighborhood or area surrounding the pixels of non-suspect objects. Small neighborhoods are identified around the non-suspect objects, e.g., squares of 5×5 pixels, and brightness values of the non-suspect pixels in each of these areas is averaged. Each average value of the neighborhood is the threshold for every pixel within that neighborhood. FIG. 4E shows the binarized text of fragment 401. The pixels which have not yet been binarized are marked in gray.

While binarizing text, threshold statistics are gathered for subsequent background binarization. The background may comprise all pixels outside the object boundaries. For example, threshold statistics are calculated for squares and a histogram is built. The horizontal axis of the histogram corresponds to the brightness values from 0 to 255, and the vertical axis contains the average values of the binarization thresholds in the given square. The number of pixels that was used to average the thresholds is the weight of a point on the histogram. The greater the weight, the more reliable are the threshold statistics.

Not all the pixels that were binarized in the course of text binarization are used to calculate the background statistics. Only those pixels are used which are located at some distance from the non-suspect pixels. This ensures that statistics are gathered only for the background and not for the text. Often, text and background located in different parts of the image will have close brightness values. For example, text 101 and background 102 in FIG. 1 have similar brightness values. If statistics are gathered only for the text, they may be used to binarize the neighboring background, which will produce a wrong result.

When gathering statistics, it may happen that for the same brightness value, there are different threshold values in the given square (some may be greater than the brightness value, and some may be lower, i.e., some may be designating white and some may be designating black). A decision must be made whether these pixels should be binarized as black or as white. If the thresholds for these pixels are simply averaged, then, when binarizing this square, the pixels with the same brightness value may be considered as either black or white. That is the danger of averaging thresholds of different types for the same brightness value. Therefore, when gathering statistics in each square, two histograms are created: first— one contains the thresholds which designate black, and the second contains the thresholds which designate white. Next, a resulting histogram is created which includes the points with the best statistics (with the greatest weight).

By way of a practical example, statistics may be gathered in a given region of 10 pixels with a brightness value of 100. The average brightness values for these pixels may be as follows: 99, 105, 112, 93, 102, 95, 93, 109, 105, and 103. Out of these 10 values, separate average values are calculated from those below 100 and those above 100, and to each is assigned a weight equal to the number of pixels based on which averaging was performed. Thus, in this example, there are 4 pixels below 100 and 6 pixels above 100. Their average values are 95 with a weight of 4, and 106 with a weight of 6, respectively. These statistics will designate black and white, respectively. The value of 106 will be included in the resulting histogram because it has greater weight (6, as opposed to 4). Therefore, all the other pixels in this square that have a brightness value of 100 will be binarized, at block 307, using a threshold of 106.

Next, statistics (gathered during binarizing of the background) and the text are used to binarize the remaining non-suspect pixels in each square. The pixels surrounding suspect objects may be ignored. If, in one square, there is no threshold for a brightness value, the threshold may be taken from the nearest square. If none of the squares have the necessary threshold, the threshold may be calculated as follows: from several squares nearest to the given square, expanded statistics are gathered, which contain the best points from the statistics of the neighboring squares.

Figure 4F:
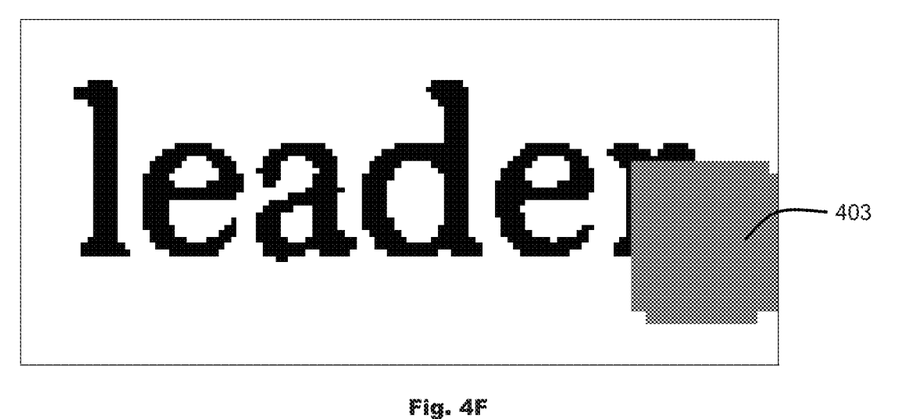
FIG. 4F shows the fragment 401 after background binarization.

FIG. 4F shows the binarized background of the fragment 401. The gray area 403 is the area which has not been binarized, because it surrounds the point 402, considered suspect, as it is a small object and could potentially be noise rather than a full stop at the end of the sentence. Therefore, this area is ignored at this stage.

Once the background is binarized, all the pixels on the threshold map are filled, except those which were deliberately ignored. These pixels are filled using an approximation technique to approximate threshold binarization values for pixels not in any local binarization threshold map, for example using simple linear interpolation in both directions, at block 308. First, they are interpolated horizontally. If this fails, the pixels are interpolated vertically. Once the interpolation is finished, the threshold map becomes completely filled and can be used to binarize, at block 309, the source image.

Figure 4G:
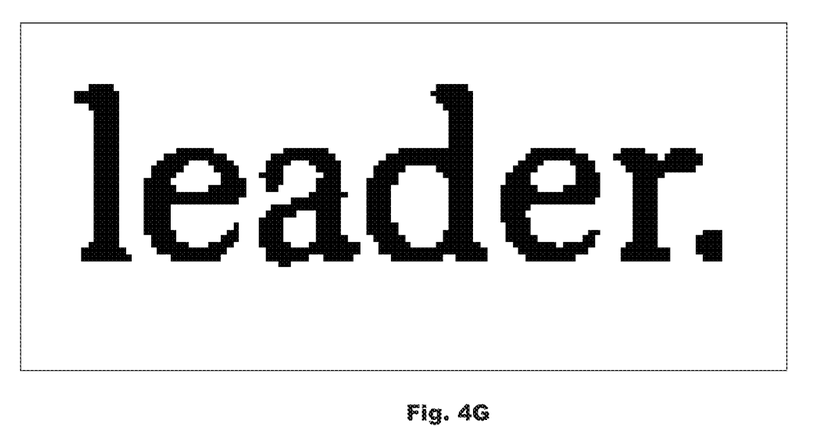
FIG. 4G shows the fragment 401 after final binarization.

FIG. 4G shows the result of the binarization of fragment 401, and FIG. 2 shows the result of binarizing the entire source image of FIG. 1.

For improvement of binarization results, additional processes may be used.

Detecting and recognizing text with very small characters is a difficult task for OCR methods and systems, and in particular for obtaining a binarization of high quality. With reference to FIG. 3, the smoothing process at block 302 is effective against textured areas and noisiness but can blur some small-sized text. To improve the binarization quality of small-sized text, small characters can be detected during object classification at block 305 and binarized from a portion or entirety of an original (non-smoothed) image. I.e., for small objects classified as text the binarization thresholds are calculated using the original image.

Another difficulty may arise in the case of recognition within or of photographic images. Photographs are often blurred and have non-uniform brightness. Such images may be binarized without preliminary smoothing. Local equalization of brightness also may be performed for photographic images. In an exemplary embodiment, an image is segmented into segments, e.g., squares of 64×64 pixels, and for each segment a mean brightness is calculated. Segments may be of non-uniform size, shape or size and shape. Then, for each segment a coefficient is adjusted so that the mean brightness in all segments becomes nearly the same.

Figure 5:
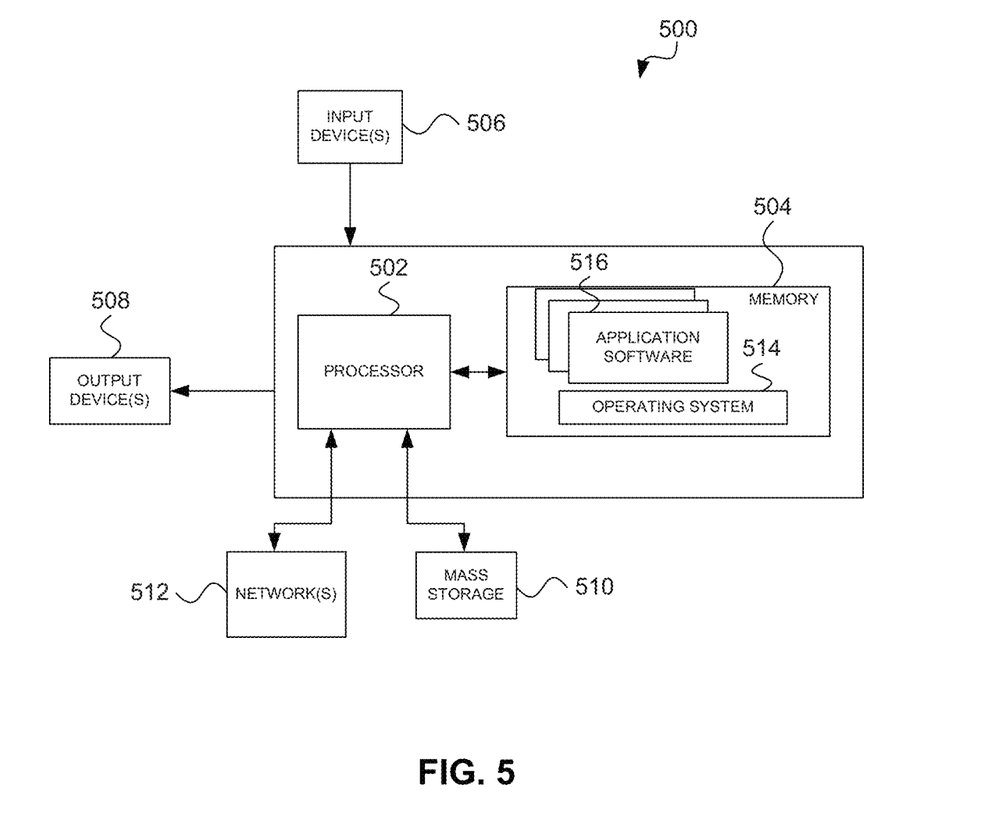
FIG. 5 shows a block diagram of a system for image binarization in accordance with an example embodiment.

FIG. 5 shows an example of a system 500 which is capable of implementing the method of FIG. 3. The system 500 may include an input device 506, such as a scanner, for loading the image. Alternatively, a pre-loaded image may be communicated to the system 500, e.g., via a network 512. Depending on the use of the system 500, it may be a system for image binarization, and optionally may include OCR capabilities. The system 500 may include at least one processor 502 coupled to a memory 504. The processor 502 represents one or more processors (e.g., microprocessors), and the memory 504 represents one or more random access memories (RAM). The memory 504 may comprise the main storage of the system 500, as well as any supplemental levels of memory, e.g., cache memories, non-volatile or back-up memories (e.g., programmable or flash memories), read-only memories, etc. In addition, the memory 504 may be considered to include memory storage physically located elsewhere in the system 500, e.g. any cache memory in the processor 502 as well as any storage capacity used as a virtual memory, e.g., as stored on a mass storage device 510, where the mass storage device 510 may be accessible across one or more connections or networks.

The system 500 also typically receives a number of inputs and outputs for communicating information externally. For interface with a user or operator, the system 500 may include one or more user input devices 506 (e.g., a keyboard, a mouse, imaging device) and one or more output devices 508 (e.g., a Liquid Crystal Display (LCD) panel, a sound playback device (e.g., speaker, headphones)).

For additional storage, the system 500 may also include one or more mass storage devices 510, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others.

Furthermore, the system 500 may include an interface with one or more networks 512 (e.g., a local area network (LAN), a wide area network (WAN), a wireless network, and/or the Internet, among others) to permit communication of information with other computers coupled to the networks. It should be appreciated that the system 500 typically includes suitable analog and/or digital interfaces between the processor 502 and each of the components 504, 506, 508, and 512 as is known in the art.

The system 500 operates under the control of an operating system 514, and executes various computer software applications, components, programs, objects, modules, etc. to implement the techniques described above. Moreover, various applications, components, programs, objects, etc., collectively indicated by reference 516 in FIG. 5, may also execute on one or more processors in another computer coupled to the system 500 via a network 512, e.g., in a distributed computing environment, whereby the processing required to implement the functions of a computer program may be allocated to multiple computers over a network. The application software 516 may include a set of instructions which, when executed by the processor 502, causes the system 500 to implement the method 300 of FIG. 3.

In general, the routines executed to implement the embodiments of the invention may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Although the present invention has been described with reference to specific exemplary embodiments, it will be evident that various modifications and changes can be made to these embodiments without departing from the broader spirit of the invention. Accordingly, the specification and drawings are to be regarded in an illustrative sense rather than in a restrictive sense.

I claim:

1. A method for binarizing an image that includes text, the method comprising:
    acquiring a copy of the image in an electronic memory of a computing device;
    creating a gradient image from the image that includes text;
    identifying one or more objects in the gradient image, wherein identifying the one or more objects in the gradient image includes identifying one or more boundaries in the gradient image for each such object based on a contrast value for the respective image object;
    identifying any separation objects from the identified one or more objects in the gradient image;
    creating a binarization threshold map for the image, wherein creating the binarization threshold map includes assigning a threshold binarization value for use with each pixel of the image, wherein the binarization threshold map includes a same threshold binarization value for each identified image object, and wherein the assigned threshold binarization values are adjusted based in part upon any neighboring separation objects; and binarizing the image by comparing a brightness value of each pixel with a respective threshold binarization value from the binarization threshold map.

2. The method of claim 1, wherein the method further comprises:
after identifying any separation objects, classifying any separation objects as either a gradient separator or a non-gradient separator by determining a number of times that a gradient direction in the gradient image changes while crossing the respective separation object changes direction, wherein a gradient direction changes one time when crossing a gradient separator.

3. The method of claim 2, wherein the method further comprises:
after classifying any separation objects, identifying any incut regions associated with any of the separation objects by identifying the boundaries of said incut regions; and
associating an indicator with each text associated with or located in said incut regions, wherein the indicator is available for use in further processing of text associated with or located in said incut regions.

4. The method of claim 2, wherein the method further comprises:
before binarizing the image, modifying the binarization threshold map for the image based at least in part upon the classifying of separation objects.

5. The method of claim 1, wherein identifying one or more objects in the gradient image further includes classifying each object as suspect or non-suspect, and wherein assigning the threshold binarization value for use with each pixel of the image includes assigning said value based at least in part upon said classification of suspect versus non-suspect objects in the vicinity of a respective pixel.

6. The method of claim 5, wherein said classifying each object as suspect or non-suspect includes specifying a penalty for a respective object and classifying the object as suspect when a value associated with the respective object exceeds the penalty and classifying the object as non-suspect when the value associated with the respective object does not exceed the penalty.

7. The method of claim 6, wherein said classifying is performed locally based on a segment of the image and a mean penalty for each segment, wherein a segment is a portion of arbitrary shape and size of said image.

8. A method for binarizing an electronic image with text of different sizes, the method comprising:
acquiring, by one or more processors, an electronic copy of the electronic image;
performing, by one or more processors, a smoothing function on the electronic image;
creating, by one or more processors, a gradient image from the electronic image;
identifying, by one or more processors, objects in the gradient image by identifying boundaries of the objects;
identifying, by one or more processors, likely-text objects from the identified objects;
classifying, by one or more processors, likely-text objects as text objects of a first size or as text objects of a second size, wherein text of the second size is smaller in at least one aspect than text of the first size;
identifying, by one or more processors, a region encompassing at least some of the likely-text objects of the second size;
performing, by one or more processors, a binarizing function on said identified region that encompasses at least some of the likely-text objects of the second size, wherein the binarizing function includes:
creating a binarization threshold map for the identified region using values from the (non-smoothed) electronic copy of the image; and
comparing a brightness value of each pixel of the identified region of the electronic copy of the electronic image with a respective threshold binarization value from the binarization threshold map.

9. The method of claim 8, wherein the method further comprises:
performing, by one or more processors, an optical character recognition (OCR) function on the identified region of the image after performing the binarizing function.

10. The method of claim 8, wherein the binarization threshold map includes a same threshold binarization value for each identified image object.

11. The method of claim 8, wherein the method further comprises:
identifying, by one or more processors, a second region encompassing at least some of the likely text objects of the second size; and
performing, by one or more processors, a binarizing function on said identified second region, wherein the binarizing function includes:
creating a binarization threshold map ("BTM") for the identified second region ("second BTM") using values from the (smoothed) electronic image; and
comparing a brightness value of each pixel of the identified second region with a respective threshold binarization value from the second BTM.

12. The method of claim 8, wherein a likely-text object is at least a character or punctuation mark.

13. A device for binarizing and processing an electronic image, the device comprising:
a processor;
a memory in electronic communication with the processor, the memory configured with instructions for:
creating a gradient image from the electronic image that includes text;
identifying one or more objects in the gradient image;
identifying one or more boundaries in the gradient image for each identified one or more objects based on a contrast value for the respective identified object;
identifying any separation objects from the identified one or more objects in the gradient image;
assigning a threshold binarization value for use with each pixel of the electronic image;
storing said assigned threshold binarization values in a binarization threshold map, wherein the binarization threshold map includes a same threshold binarization value for each identified image object identified bin the gradient image, and wherein the assigned threshold binarization values are adjusted based in part upon any neighboring identified separation objects; and
creating a binarized representation of the electronic image by comparing a brightness value of each pixel of the electronic image with a respective threshold binarization value from the binarization threshold map.

14. The device of claim 13, wherein the memory is further configured with instructions for:
after identifying any separation objects, classifying any separation objects as either a gradient separator or a non-gradient separator by determining a number of times that a gradient direction in the gradient image changes crossing the respective separation object, wherein a gradient direction changes one time crossing a gradient separator.

15. The device of claim 14, wherein the memory is further configured with instructions for:

after classifying any separation objects, identifying any incut regions associated with any of the separation objects by identifying the boundaries of said incut regions; and associating an indicator with each text associated with or located in said incut regions, wherein the indicator is available for use in further processing of text associated with or located in said incut regions.

16. The device of claim 14, wherein the memory is further configured with instructions for:

before binarizing the image, modifying the binarization threshold map for the image based at least in part upon the classifying of separation objects.

17. The device of claim 13, wherein the instruction or instructions for identifying one or more objects in the gradient image further includes classifying each object as suspect or non-suspect, and wherein assigning the threshold binarization value for use with each pixel of the image includes assigning said value based at least in part upon said classification of suspect versus non-suspect objects in the vicinity of a respective pixel.

18. The device of claim 17, wherein the instruction or instructions for classifying each object as suspect or non-suspect includes specifying a penalty for a respective object and classifying the object as suspect when a value associated with the respective object exceeds the penalty and classifying the object as non-suspect when the value associated with the respective object does not exceed the penalty.

19. The device of claim 17, wherein the instruction or instructions for classifying is performed locally based on a segment of the image and a mean penalty for each segment, wherein a segment is a portion of arbitrary shape and size of said image.

* * * * *